(12) United States Patent
Hu (10) Patent No.: US 9,699,293 B2
(45) Date of Patent: Jul. 4, 2017

(54) BASE OF CORDLESS DIGITAL TELEPHONE SET, CORDLESS DIGITAL TELEPHONE SET, AND VOICE DATA TRANSMITTING METHOD

(71) Applicant: Huawei Device Co., Ltd., Shenzhen (CN)

(72) Inventor: Xiaodong Hu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/110,657

(22) PCT Filed: Jan. 9, 2014

(86) PCT No.: PCT/CN2014/070412
§ 371 (c)(1),
(2) Date: Jul. 8, 2016

(87) PCT Pub. No.: WO2015/103761
PCT Pub. Date: Jul. 16, 2015

(65) Prior Publication Data
US 2016/0344857 A1 Nov. 24, 2016

(51) Int. Cl.
*H04M 1/00* (2006.01)
*H04M 1/725* (2006.01)
*H04M 3/00* (2006.01)

(52) U.S. Cl.
CPC ..... *H04M 1/7253* (2013.01); *H04M 1/72502* (2013.01); *H04M 3/005* (2013.01); *H04M 1/725* (2013.01); *H04M 2250/02* (2013.01)

(58) Field of Classification Search
None
See application file for complete search history.

(56) References Cited

U.S. PATENT DOCUMENTS

| 6,219,417 | B1 * | 4/2001 | Zhou | H04M 3/005 |
| | | | | 379/377 |
| 6,608,889 | B2 * | 8/2003 | Berthoud | H04M 1/274516 |
| | | | | 379/355.06 |

(Continued)

FOREIGN PATENT DOCUMENTS

| CN | 101193373 A | 6/2008 |
| CN | 101232686 A | 7/2008 |

(Continued)

*Primary Examiner* — Creighton Smith
(74) *Attorney, Agent, or Firm* — Slater Matsil, LLP (57) ABSTRACT

Embodiments disclose a base of a cordless digital telephone set and a cordless digital telephone set. In the base of a cordless digital telephone set, a subscriber circuit module and a Bluetooth module can establish, under control of a main control module, a communications channel for direct interconnection, thereby reducing workload of the main control module, and optimizing a transmission path of voice data. The base of a cordless digital telephone set in embodiments of the present invention includes a switch module. When receiving a first control signal that is sent by the main control module, the switch module connects a communication data output pin of the subscriber line interface circuit module to a communication data input pin of the Bluetooth module; and connects a communication data input pin of the subscriber line interface circuit module to a communication data output pin of the Bluetooth module.

14 Claims, 2 Drawing Sheets

(56) References Cited

U.S. PATENT DOCUMENTS

| | | | |
|---|---|---|---|
| 8,189,569 B2* | 5/2012 | Ma | H04M 1/2535 370/353 |
| 2006/0148420 A1* | 7/2006 | Wonak | H04M 1/725 455/74.1 |
| 2007/0105548 A1* | 5/2007 | Mohan | H04M 1/725 455/426.1 |
| 2007/0223455 A1* | 9/2007 | Chang | H04M 7/0057 370/352 |
| 2008/0049721 A1 | 2/2008 | Ouyang et al. | |
| 2008/0280561 A1 | 11/2008 | Lin | |
| 2011/0007675 A1 | 1/2011 | Chiou et al. | |

FOREIGN PATENT DOCUMENTS

| | | |
|---|---|---|
| CN | 101287237 A | 10/2008 |
| CN | 101442837 A | 5/2009 |
| CN | 101577986 A | 11/2009 |
| CN | 102468874 A | 5/2012 |
| EP | 1501244 A2 | 1/2005 |

* cited by examiner

BASE OF CORDLESS DIGITAL TELEPHONE SET, CORDLESS DIGITAL TELEPHONE SET, AND VOICE DATA TRANSMITTING METHOD

This patent application is a national phase filing under section 371 of PCT/CN2014/070412, filed Jan. 9, 2014 and is incorporated herein by reference in its entirety.

TECHNICAL FIELD

The present invention relates to the field of digital communications, and in particular, to a base of a cordless digital telephone set, a cordless digital telephone set, and a voice data transmitting method.

BACKGROUND

With development of communications technologies, interconnection between phones and people becomes closer. As a common phone type, a cordless digital telephone set uses a radio wave as a medium to implement "cordless" connection between a base and a handset, which overcomes constraint from a phone cord between a conventional telephone set and its handset, and brings great convenience and more flexible call experience for people.

Using an existing cordless digital telephone set as an example, generally, the cordless digital telephone set includes a base and at least one cordless handset. Further, the base includes a main control module, a subscriber line interface circuit module, and a Bluetooth module. The subscriber line interface circuit (SLIC for short) module is configured to process analog voice data, and modulate the analog voice data into corresponding digital voice data by means of pulse code modulation. Based on characteristics of Bluetooth communication, such as a fast speed and good confidentiality, the Bluetooth module is configured to complete a process of voice data exchange between the base and the handset.

However, according to a rule of classifying digital communications system working modes, it can be found that in the process of transferring the voice data by the main control module, the subscriber line interface circuit module, and the Bluetooth module, the main control module works as a primary device. The subscriber line interface circuit module and the Bluetooth module both work as secondary devices. Using a working process in which the base sends voice data to the handset as an example, a transmission path of the voice data may be described as follows: the main control module—the subscriber line interface circuit module—the main control module—the Bluetooth module—a module corresponding to the handset (details of specific processing of the voice data by the modules are omitted). Therefore, for the base of the existing cordless digital telephone set, the main control module needs to bear relatively heavy workload during normal work, and the transmission path of the voice data is inappropriate.

SUMMARY

Embodiments of the present invention provide a base of a cordless digital telephone set, a cordless digital telephone set, and a voice data transmitting method. In the base of a cordless digital telephone set, when receiving a high level control signal that is sent by a main control module, a switch module establishes a communications channel by using which a subscriber circuit module is directly interconnected to a Bluetooth module, thereby reducing workload of the main control module, and optimizing a transmission path of voice data.

To resolve the foregoing technical problem, the following technical solutions are used in the embodiments of the present invention.

According to one aspect, an embodiment of the present invention provides a base of a cordless digital telephone set, where the base includes: a main control module, a subscriber line interface circuit module, and a Bluetooth module, and the base further includes a switch module. When the switch module receives a first control signal that is sent by the main control module, the switch module connects a communication data output pin of the subscriber line interface circuit module to a communication data input pin of the Bluetooth module; and connects a communication data input pin of the subscriber line interface circuit module to a communication data output pin of the Bluetooth module.

In a first possible implementation manner, when the switch module receives a second control signal that is sent by the main control module, the switch module connects a communication data output pin of the main control module to the communication data input pin of the subscriber line interface circuit module; and connects a communication data input pin of the main control module to the communication data output pin of the subscriber line interface circuit module.

In a second possible implementation manner, the switch module includes a first single pole double throw switch and a second single pole double throw switch. When the first single pole double throw switch and the second single pole double throw switch receive the first control signal that is sent by the main control module, the first single pole double throw switch is thrown to a first end, so that the communication data output pin of the subscriber line interface circuit module is connected to the communication data input pin of the Bluetooth module by using the first end of the first single pole double throw switch; and the second single pole double throw switch is thrown to a first end, so that the communication data input pin of the subscriber line interface circuit module is connected to the communication data output pin of the Bluetooth module by using the first end of the second single pole double throw switch. When the first single pole double throw switch is thrown to the first end and the second single pole double throw switch is thrown to the first end, the main control module provides a clock signal and a frame synchronization signal to the subscriber line interface circuit module and the Bluetooth module.

With reference to the second possible implementation manner, in a third possible implementation manner, when the first single pole double throw switch and the second single pole double throw switch receive the second control signal that is sent by the main control module, the first single pole double throw switch is thrown to a second end, so that the communication data output pin of the subscriber line interface circuit module is connected to the communication data input pin of the main control module by using the second end of the first single pole double throw switch; and the second single pole double throw switch is thrown to a second end, so that the communication data input pin of the subscriber line interface circuit module is connected to the communication data output pin of the main control module by using the second end of the second single pole double throw switch. When the first single pole double throw switch is thrown to the second end and the second single pole double throw switch is thrown to the second end, the main control module provides a clock signal and a frame synchronization signal to the subscriber line interface circuit module.

According to another aspect, an embodiment of the present invention further provides a cordless digital telephone set, including the foregoing base and at least one cordless handset, where the base completes exchange of voice data with the cordless handset by means of wireless communication, and a frequency band for the wireless communication is any one or several of 2.4 GHZ, 1.8 GHZ, 5.8 GHZ, and 45 MHZ to 49 MHZ.

According to still another aspect, an embodiment of the present invention further provides a voice data transmitting method, based on a base of a cordless digital telephone set of the foregoing structure, where the base of a cordless digital telephone set includes: a main control module, a subscriber line interface circuit module, a Bluetooth module, and a switch module. The voice data transmitting method includes: sending, by the main control module, a first control signal to the switch module; and according to the first control signal, connecting, by the switch module, a communication data output pin of the subscriber line interface circuit module to a communication data input pin of the Bluetooth module; and connecting, by the switch module, a communication data input pin of the subscriber line interface circuit module to a communication data output pin of the Bluetooth module.

In a first possible implementation manner, the voice data transmitting method further includes: sending, by the main control module, a second control signal to the switch module; and according to the second control signal, connecting, by the switch module, a communication data output pin of the main control module to the communication data input pin of the subscriber line interface circuit module; and connecting, by the switch module, a communication data input pin of the main control module to the communication data output pin of the subscriber line interface circuit module.

The embodiments of the present invention provide a base of a cordless digital telephone set, a cordless digital telephone set, and a voice data transmitting method. With a disposed switch module, when the switch module receives a first control signal that is sent by a main control module, a subscriber line interface circuit module and a Bluetooth module establish a direct communication interconnection by using the switch module, so as to optimize a transmission path of voice data in the base of a cordless digital telephone set, thereby reducing load of the main control module.

DETAILED DESCRIPTION OF ILLUSTRATIVE EMBODIMENTS

Embodiments of the present invention provide a base of a cordless digital telephone set, a cordless digital telephone set, and a voice data transmitting method. In the base of a cordless digital telephone set, when receiving a first control signal that is sent by a main control module, a switch module establishes a communications channel by using which a subscriber circuit module is directly interconnected to a Bluetooth module, thereby reducing workload of the main control module, and optimizing a transmission path of voice data.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The embodiments of the present invention are described below in detail with reference to the following accompanying drawings.

Figure 1:
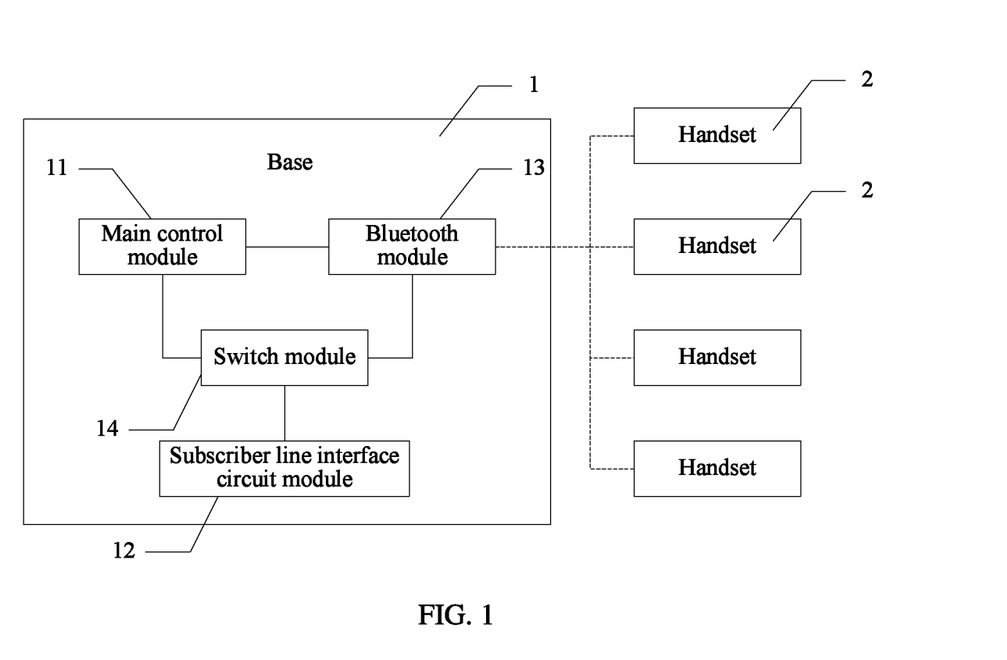
FIG. 1 is a structural block diagram of a cordless digital telephone set according to an embodiment of the present invention.

An embodiment of the present invention provides a base of a cordless digital telephone set, as shown in FIG. 1. It should be noted that FIG. 1 is a structural block diagram of the cordless digital telephone set. The cordless digital telephone set includes a base 1 and at least one cordless handset 2. Further, the base 1 includes: a main control module 11, a subscriber line interface circuit module 12, and a Bluetooth module 13; in addition, the base 1 further includes a switch module 14. When the switch module 14 receives a first control signal that is sent by the main control module 11, the switch module 14 connects a communication data output pin of the subscriber line interface circuit module 12 to a communication data input pin of the Bluetooth module 13; and connects a communication data input pin of the subscriber line interface circuit module 12 to a communication data output pin of the Bluetooth module 13.

Further, when the switch module 14 receives a second control signal that is sent by the main control module 11, the switch module 14 connects a communication data output pin of the main control module 11 to the communication data input pin of the subscriber line interface circuit module 12; and connects a communication data input pin of the main control module 11 to the communication data output pin of the subscriber line interface circuit module 12.

It should be noted that the first control signal and the second control signal may be level signals, for example, the first control signal is a high level signal, and the second control signal is a low level signal, which is not specifically limited in this embodiment of the present invention.

As shown in FIG. 1, FIG. 1 shows multiple cordless handsets 2. According to different driving manners, two cases may occur for the multiple cordless handsets 2. First: one of the multiple cordless handsets 2 is a first cordless handset playing a leading role, and the other cordless handsets all complete voice data exchange work with the base by using the first cordless handset; second: the multiple cordless handsets 2 are equal, that is, any cordless handset can directly complete a process of voice data exchange with the base. It should be noted that this embodiment of the present invention focuses on introducing the base of the cordless digital telephone set. As for types of the handsets, no further limitations are set herein.

Specifically, a situation of transmission of voice data in the base of a cordless digital telephone set provided in this embodiment of the present invention is introduced in detail by using a specific implementation manner as an example.

Figure 2:
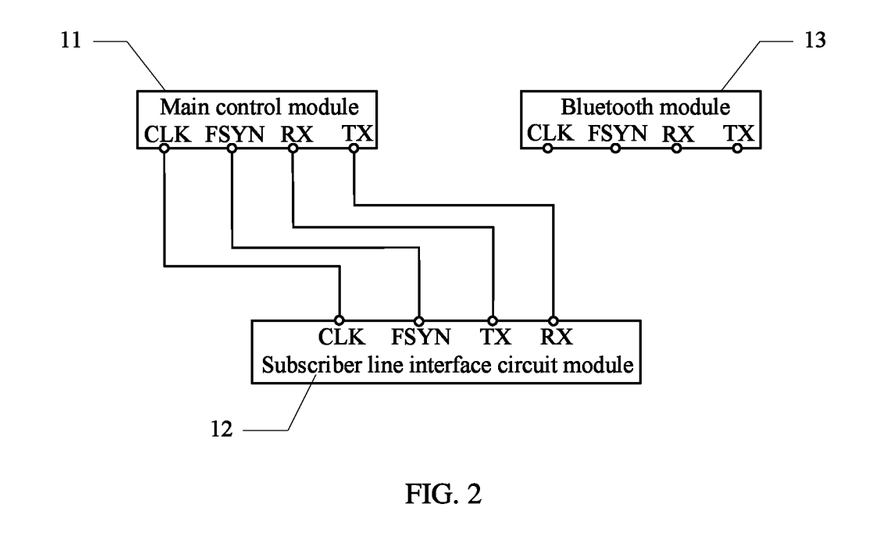
FIG. 2 is schematic diagram of circuit connection of a base of a cordless digital telephone set according to an embodiment of the present invention when a first single pole double throw switch and a second single pole double throw switch are both thrown to a second end.

It is assumed that the switch module includes a first single pole double throw switch and a second single pole double throw switch, and the first single pole double throw switch and the second single pole double throw switch both include a first end and a second end. First, as shown in FIG. 2, the main control module 11 acquires voice data, and sends the voice data to the subscriber line interface circuit module 12, so that the interface line circuit module 12 completes a modulation process of converting the voice data from an analog signal to a digital signal.

The first single pole double throw switch and the second single pole double throw switch receive a second control signal that is sent by the main control module. In this case, the first single pole double throw switch and the second single pole double throw switch are both thrown to the second end, so as to establish a communications channel between the subscriber line interface circuit module 12 and the main control module 11. A process of establishment of the communications channel between the subscriber line interface circuit module 12 and the main control module 11 may be described as follows: As shown in FIG. 2, when the first single pole double throw switch is thrown to the second end, the communication data output pin (TX end) of the subscriber line interface circuit module 12 is connected to the communication data input pin (RX end) of the main control module 11 by using the second end of the first single pole double throw switch. When the second single pole double throw switch is thrown to the second end, the communication data input pin (RX end) of the subscriber line interface circuit module 12 is connected to the communication data output pin (TX end) of the main control module 11 by using that the second single pole double throw switch is thrown to the second end.

In addition, the main control module 11 is connected to a CLK pin of the subscriber line interface circuit module 12 by using a CLK pin, and the main control module 11 is connected to a PSYN pin of the subscriber line interface circuit module 12 by using a PSYN pin. That is, the main control module 11 provides a clock signal and a frame synchronization signal to the subscriber line interface circuit module 12 (optionally, in this case, connections between the CLK pin and PSYN pin of the main control module 11 and corresponding pins of the Bluetooth module 13 may also be disconnected, so that the Bluetooth module 13 is in a non-working state).

So far, a bidirectional-communication voice data transmission channel between the main control module 11 and the subscriber line interface circuit module 12 has been established. The voice data can be transmitted from the main control module 11 to the subscriber line interface circuit module 12.

It should be noted that, as shown in FIG. 2, the establishment of the communications channel is completed by two (or more) single pole double throw switches. Certainly, a person skilled in the art may also use a single pole double throw switch group to complete the action of establishing the communications channel. Details are not described herein.

Figure 3:
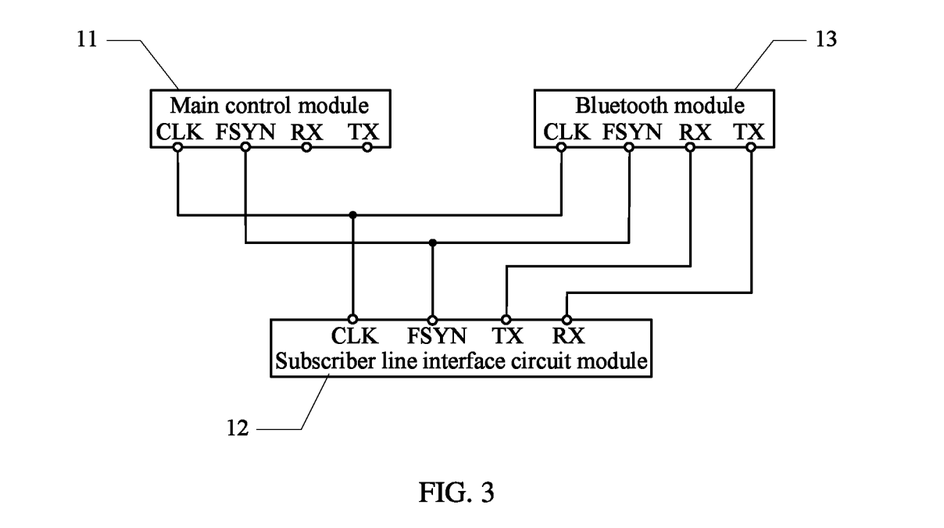
FIG. 3 is schematic diagram of circuit connection of a base of a cordless digital telephone set according to an embodiment of the present invention when a first single pole double throw switch and a second single pole double throw switch are both thrown to a first end.

Then, as shown in FIG. 3, after completing modulation of converting the voice data from an analog signal to a digital signal, the subscriber line interface circuit module 12 continues to send the voice data to the Bluetooth module 13, so that the Bluetooth module 13 further sends the voice data to a cordless handset.

The first single pole double throw switch and the second single pole double throw switch receive a first control signal that is sent by the main control module. In this case, the first single pole double throw switch and the second single pole double throw switch are both thrown to the first end, so as to establish a communications channel between the subscriber line interface circuit module 12 and the Bluetooth module 13 that are under control of the main control module 11. A process of establishment of the communications channel between the subscriber line interface circuit module 12 and the Bluetooth module 13 that are under control of the main control module 11 may be described as follows: As shown in FIG. 3, when the first single pole double throw switch is thrown to the first end, the communication data output pin (TX end) of the subscriber line interface circuit module 12 is connected to the communication data input pin (RX end) of the Bluetooth module 13 by using the first end of the first single pole double throw switch. When the second single pole double throw switch is thrown to the first end, the communication data input pin (RX end) of the subscriber line interface circuit module 12 is connected to the communication data output pin (TX end) of the Bluetooth module 13 by using the first end of the second single pole double throw switch.

In addition, the main control module 11 is separately connected to CLK pins of the subscriber line interface circuit module 12 and the Bluetooth module 13 by using the CLK pin, and the main control module 11 is connected to PSYN pins of the subscriber line interface circuit module 12 and the Bluetooth module 13 by using the PSYN pin. That is, the main control module 11 simultaneously provides a same clock signal and frame synchronization signal to the subscriber line interface circuit module 12 and the Bluetooth module 13.

So far, the subscriber line interface circuit module 12 and the Bluetooth module 13 are both controlled by the same clock signal and frame synchronization signal (because the clock signal and the frame synchronization signal are both provided by the main control module 11). Therefore, the subscriber line interface circuit module 12 and the Bluetooth module 13 can communicate with each other according to the same signal and frame synchronization signal by using the established bidirectional-communication voice data transmission channel, and the voice data is further transmitted from the subscriber line interface circuit module 12 to the Bluetooth module 13.

Then, the Bluetooth module 13 sends the received voice data to a corresponding cordless handset.

It should be noted that it can be clearly determined according to the foregoing description that a transmission path of voice data in the base of a cordless digital telephone set provided in this embodiment of the present invention may be described as follows: the main control module 11—the subscriber line interface circuit module 12—the Bluetooth module 13. Therefore, the transmission path of the base of a cordless digital telephone set provided in this embodiment of the present invention is better than that of a base of a cordless digital telephone set in the prior art.

In addition, the foregoing established voice data transmission channel can be used for bidirectional communication. Therefore, the voice data can also be transmitted along the following transmission path in the base of a cordless digital telephone set provided in this embodiment of the present invention: the Bluetooth module 13—the subscriber line interface circuit module 12—the main control module 11.

This embodiment of the present invention provides a base of a cordless digital telephone set. With a disposed switch module, when the switch module receives a high level control signal that is sent by a main control module, a subscriber line interface circuit module and a Bluetooth module establish a direct communication interconnection by using the switch module, so as to optimize a transmission path of voice data in the base of a cordless digital telephone set, thereby reducing load of the main control module.

In another aspect, an embodiment of the present invention provides a cordless digital telephone set, as shown in FIG. 1. The cordless digital telephone set includes the base 1 and the at least one cordless handset 2 that are mentioned in the foregoing embodiment. The base 1 completes exchange of voice data with the handset 2 by means of wireless communication. Further, a frequency band for the wireless communication is any one or several of 2.4 GHZ, 1.8 GHZ, 5.8 GHZ, and 45 MHZ to 49 MHZ.

In still another aspect, an embodiment of the present invention further provides a voice data transmitting method. The voice data transmitting method is based on the base of a cordless digital telephone set mentioned in the foregoing embodiment. A structure of the base of a cordless digital telephone set is shown in FIG. 1. The base 1 includes a main control module 11, a subscriber line interface circuit module 12, a Bluetooth module 13, and a switch module 14.

Figure 4:
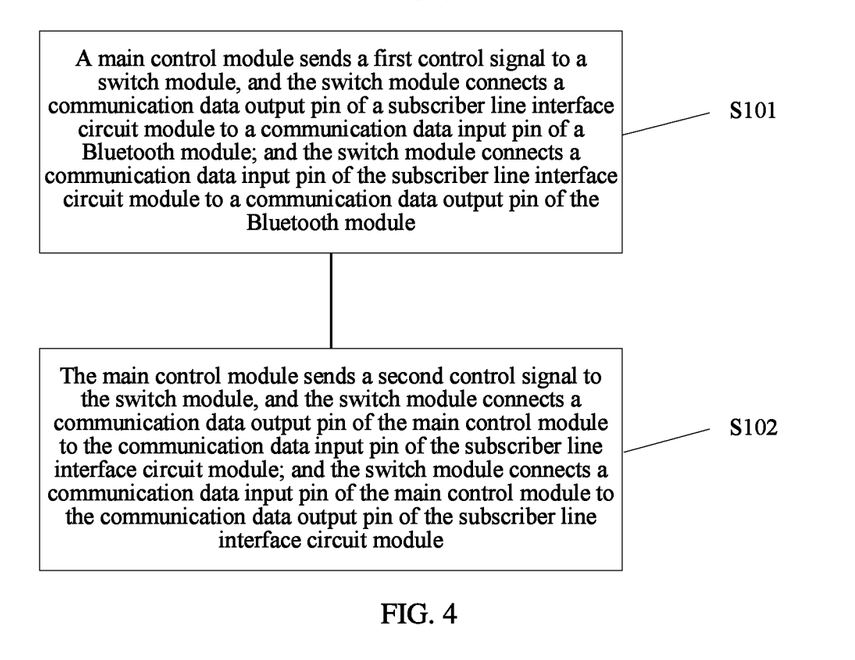
FIG. 4 is a schematic flowchart of a voice data transmitting method according to an embodiment of the present invention.

The voice data transmitting method is shown in FIG. 4, including the following steps.

Step S101: The main control module sends a first control signal to the switch module, and the switch module connects a communication data output pin of the subscriber line interface circuit module to a communication data input pin of the Bluetooth module; and the switch module connects a communication data input pin of the subscriber line interface circuit module to a communication data output pin of the Bluetooth module.

Step S102: The main control module sends a second control signal to the switch module, and the switch module connects a communication data output pin of the main control module to the communication data input pin of the subscriber line interface circuit module; and the switch module connects a communication data input pin of the main control module to the communication data output pin of the subscriber line interface circuit module.

It should be noted that this embodiment of the present invention provides a voice data transmitting method, and the voice data transmitting method is based on the base of a cordless digital telephone set provided in the foregoing embodiment. For specific steps of the voice data transmitting method, refer to a related description about the base of a cordless digital telephone set in the foregoing embodiment. Details are not described herein again. A structure of the cordless digital telephone set in this embodiment of the present invention also includes the base of a cordless digital telephone set in the foregoing embodiment, and is not described herein again.

The embodiments of the present invention provide a cordless digital telephone set and a voice data transmitting method. In a base of a cordless digital telephone set, with a disposed switch module, when the switch module receives a first control signal that is sent by a main control module, a subscriber line interface circuit module and a Bluetooth module establish a direct communication interconnection by using the switch module, so as to optimize a transmission path of voice data in the base of a cordless digital telephone set, thereby reducing load of the main control module.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base of a cordless digital telephone set, wherein the base comprises:
    a main controller;
    a subscriber line interface circuit module;
    a Bluetooth module; and
    a switch configured to, in response to receiving a first control signal that is sent by the main controller, to connect a communication data output pin of the subscriber line interface circuit module to a communication data input pin of the Bluetooth module, and to connect a communication data input pin of the subscriber line interface circuit module to a communication data output pin of the Bluetooth module.

2. The base of a cordless digital telephone set according to claim 1, wherein the switch is further configured to, in response to receiving a second control signal that is sent by the main controller, connect a communication data output pin of the main controller to the communication data input pin of the subscriber line interface circuit module, and connect a communication data input pin of the main controller to the communication data output pin of the subscriber line interface circuit module.

3. The base of a cordless digital telephone set according to claim 2, wherein the switch comprises a first single pole double throw switch and a second single pole double throw switch;
    wherein the first single pole double throw switch and the second single pole double throw switch are configured to be respectively thrown to respective first ends, in response to the first single pole double throw switch and the second single pole double throw switch receiving the first control signal that is sent by the main controller, so that the communication data output pin of the subscriber line interface circuit module is connected to the communication data input pin of the Bluetooth module by the first end of the first single pole double throw switch, and so that the communication data input pin of the subscriber line interface circuit module is connected to the communication data output pin of the Bluetooth module by the first end of the second single pole double throw switch; and
    wherein the main controller is configured to, in response to the first single pole double throw switch being thrown to the first end and the second single pole double throw switch being thrown to the first end, provide a clock signal and a frame synchronization signal to the subscriber line interface circuit module and the Bluetooth module.

4. The base of a cordless digital telephone set according to claim 3, wherein the first single pole double throw switch and the second single pole double throw switch are configured to be respectively thrown to respective second ends, in response to the first single pole double throw switch and the second single pole double throw switch receiving the second control signal that is sent by the main controller, so that the communication data output pin of the subscriber line interface circuit module is connected to the communication data input pin of the main controller by the second end of the first single pole double throw switch, and so that the communication data input pin of the subscriber line interface circuit module is connected to the communication data output pin of the main controller by the second end of the second single pole double throw switch; and wherein the main controller is configured to, in response to the first single pole double throw switch being thrown to the second end and the second single pole double throw switch being thrown to the second end, provide a clock signal and a frame synchronization signal to the subscriber line interface circuit module.

5. The base of a cordless digital telephone set according to claim 1, wherein:

the switch comprises a first single pole double throw switch and a second single pole double throw switch;

the first single pole double throw switch and the second single pole double throw switch are configured to be respectively thrown to respective first ends, in response to the first single pole double throw switch and the second single pole double throw switch receiving the first control signal that is sent by the main controller, so that the communication data output pin of the subscriber line interface circuit module is connected to the communication data input pin of the Bluetooth module by the first end of the first single pole double throw switch, and so that the communication data input pin of the subscriber line interface circuit module is connected to the communication data output pin of the Bluetooth module by the first end of the second single pole double throw switch; and the main controller is configured to, in response to the first single pole double throw switch being thrown to the first end and the second single pole double throw switch being thrown to the first end, provide a clock signal and a frame synchronization signal to the subscriber line interface circuit module and the Bluetooth module.

6. The base of a cordless digital telephone set according to claim 5, wherein the first single pole double throw switch and the second single pole double throw switch are configured to be respectively thrown to respective second ends, in response to the first single pole double throw switch and the second single pole double throw switch receiving a second control signal that is sent by the main controller, so that the communication data output pin of the subscriber line interface circuit module is connected to the communication data input pin of the main controller by the second end of the first single pole double throw switch, and so that the communication data input pin of the subscriber line interface circuit module is connected to the communication data output pin of the main controller by the second end of the second single pole double throw switch; and wherein the main controller is configured to, in response to the first single pole double throw switch being thrown to the second end and the second single pole double throw switch being thrown to the second end, provide a clock signal and a frame synchronization signal to the subscriber line interface circuit module.

7. A cordless digital telephone set, comprising a base of a cordless digital telephone set and a cordless handset;

wherein the base comprises a main controller, a subscriber line interface circuit module, a Bluetooth module, and a switch;

wherein the switch is configured to, in response to the switch receiving a first control signal that is sent by the main controller, connect a communication data output pin of the subscriber line interface circuit module to a communication data input pin of the Bluetooth module, and connect a communication data input pin of the subscriber line interface circuit module to a communication data output pin of the Bluetooth module; and wherein the base is configured to complete exchange of voice data with the cordless handset by means of wireless communication, and a frequency band for the wireless communication comprises 2.4 GHZ, 1.8 GHZ, 5.8 GHZ, and 45 MHZ to 49 MHZ.

8. The cordless digital telephone set according to claim 7, wherein the switch is further configured to, in response to receiving a second control signal that is sent by the main controller, connect a communication data output pin of the main controller to the communication data input pin of the subscriber line interface circuit module, and connect a communication data input pin of the main controller to the communication data output pin of the subscriber line interface circuit module.

9. The cordless digital telephone set according to claim 8, wherein the switch comprises a first single pole double throw switch and a second single pole double throw switch;

wherein the first single pole double throw switch and the second single pole double throw switch are configured to be respectively thrown to respective first ends, in response to the first single pole double throw switch and the second single pole double throw switch receiving the first control signal that is sent by the main controller, so that the communication data output pin of the subscriber line interface circuit module is connected to the communication data input pin of the Bluetooth module by the first end of the first single pole double throw switch, and so that the communication data input pin of the subscriber line interface circuit module is connected to the communication data output pin of the Bluetooth module by the first end of the second single pole double throw switch; and wherein the main controller is configured to, in response to the first single pole double throw switch being thrown to the first end and the second single pole double throw switch being thrown to the first end, provide a clock signal and a frame synchronization signal to the subscriber line interface circuit module and the Bluetooth module.

10. The cordless digital telephone set according to claim 9, wherein the first single pole double throw switch and the second single pole double throw switch are configured to be respectively thrown to respective second ends, in response to the first single pole double throw switch and the second single pole double throw switch receiving the second control signal that is sent by the main controller, so that the communication data output pin of the subscriber line interface circuit module is connected to the communication data input pin of the main controller by the second end of the first single pole double throw switch, and so that the communication data input pin of the subscriber line interface circuit module is connected to the communication data output pin of the main controller by the second end of the second single pole double throw switch; and wherein the main controller is configured to, in response to the first single pole double throw switch being thrown to the second end and the second single pole double throw switch being thrown to the second end, provide a clock signal and a frame synchronization signal to the subscriber line interface circuit module.

11. A method, wherein a base of a cordless digital telephone set comprises: a main controller, a subscriber line interface circuit module, a Bluetooth module, and a switch, and the method comprises:

sending, by the main controller, a first control signal to the switch; and according to the first control signal, connecting, by the switch, a communication data output pin of the subscriber line interface circuit module to a communication data input pin of the Bluetooth module, and connecting a communication data input pin of the subscriber line interface circuit module to a communication data output pin of the Bluetooth module.

12. The method according to claim 11, further comprising:

sending, by the main controller, a second control signal to the switch; and according to the second control signal, connecting, by the switch, a communication data output pin of the main controller to the communication data input pin of the subscriber line interface circuit module, and connecting a communication data input pin of the main controller to the communication data output pin of the subscriber line interface circuit module.

13. The method according to claim 12, wherein the switch comprises a first single pole double throw switch and a second single pole double throw switch, and the method further comprises:

in response to the first single pole double throw switch and the second single pole double throw switch receiving the first control signal that is sent by the main control, respectively throwing the first single pole double throw switch and the second single pole double throw switch to respective first ends, so that the communication data output pin of the subscriber line interface circuit module is connected to the communication data input pin of the Bluetooth module by the first end of the first single pole double throw switch, and so that the communication data input pin of the subscriber line interface circuit module is connected to the communication data output pin of the Bluetooth module by the first end of the second single pole double throw switch; and in response to the first single pole double throw switch being thrown to the first end and the second single pole double throw switch being thrown to the first end, providing, by the main controller, a clock signal and a frame synchronization signal to the subscriber line interface circuit module and the Bluetooth module.

14. The method according to claim 13, further comprising:

in response to the first single pole double throw switch and the second single pole double throw switch receiving the second control signal that is sent by the main controller, respectively throwing the first single pole double throw switch and the second single pole double throw switch to respective second ends, so that the communication data output pin of the subscriber line interface circuit module is connected to the communication data input pin of the main controller by the second end of the first single pole double throw switch, and so that the communication data input pin of the subscriber line interface circuit module is connected to the communication data output pin of the main controller by the second end of the second single pole double throw switch; and in response to the first single pole double throw switch being thrown to the second end and the second single pole double throw switch being thrown to the second end, providing, by the main controller, a clock signal and a frame synchronization signal to the subscriber line interface circuit module.

* * * * *

UNITED STATES PATENT AND TRADEMARK OFFICE
CERTIFICATE OF CORRECTION

PATENT NO. : 9,699,293 B2
APPLICATION NO. : 15/110657
DATED : July 4, 2017
INVENTOR(S) : Xiaodong Hu

Page 1 of 1

It is certified that error appears in the above-identified patent and that said Letters Patent is hereby corrected as shown below:

On the Title Page

Item (73) Assignee, Line 1, delete "Huawei Technologies Co., Ltd.," and insert --Huawei Device Co., Ltd.,--.

Signed and Sealed this
Tenth Day of July, 2018

Andrei Iancu
*Director of the United States Patent and Trademark Office*